(12) United States Patent
Goossens et al.

(10) Patent No.: US 7,161,891 B2
(45) Date of Patent: Jan. 9, 2007

(54) OPTICAL SCANNING DEVICE

(75) Inventors: Hendrik Josephus Goossens, Shanghai (CN); Teunis Willem Tukker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 day.

(21) Appl. No.: 10/531,018

(22) PCT Filed: Sep. 15, 2003

(86) PCT No.: PCT/IB03/04022

§ 371 (c)(1),
(2), (4) Date: Apr. 12, 2005

(87) PCT Pub. No.: WO2004/036568

PCT Pub. Date: Apr. 29, 2004

(65) Prior Publication Data

US 2006/0077854 A1    Apr. 13, 2006

(30) Foreign Application Priority Data

Oct. 16, 2002    (EP) ................................. 02079280

(51) Int. Cl.
*G11B 7/00* (2006.01)
(52) U.S. Cl. ............................................. 369/112.21
(58) Field of Classification Search ................. None
See application file for complete search history.

(56) References Cited

U.S. PATENT DOCUMENTS

| | | | | |
|---|---|---|---|---|
| 5,526,336 A | * | 6/1996 | Park et al. ................. 369/94 |
| 5,768,221 A | * | 6/1998 | Kasami et al. ............. 369/14 |
| 6,600,704 B1 | * | 7/2003 | Richter et al. .......... 369/44.23 |
| 2005/0243688 A1 | * | 11/2005 | Schleipen .................. 369/125 |

FOREIGN PATENT DOCUMENTS

| | | |
|---|---|---|
| EP | 0837455 A2 | 4/1998 |
| EP | 0837455 A3 | 8/1998 |
| EP | 0837455 B1 | 1/2004 |
| JP | 10149560 A | 6/1998 |
| JP | 2000187880 A | 7/2000 |
| JP | 2000195097 A | 7/2000 |
| WO | WO0193254 A1 | 12/2001 |

* cited by examiner

*Primary Examiner*—William Korzuch
*Assistant Examiner*—Christopher Lamb
(74) *Attorney, Agent, or Firm*—Michael E. Belk

(57) ABSTRACT

An optical head for use in the scanning of a record carrier, the record carrier having data stored on data tracks therein on a plurality of information layers (3, 4) at a plurality of depths within the record carrier. The optical head comprises: a movable optical element (16) arranged in an optical path to act upon a first radiation beam (12) and a second radiation beam (14) to provide the beams with a different displacement perpendicular to the optical path; and a lens system for focusing said first beam (12) at a first focal point (A) on a first information layer (3) of the record carrier and the focusing of the second beam (14) at a second different focal point (B) on a second information layer (4), wherein a spacing, transverse to the data tracks, between said first and second focal points (A, B) is controllable by varying the configuration of the movable optical element.

13 Claims, 3 Drawing Sheets

OPTICAL SCANNING DEVICE

This invention relates to an optical scanning device and an optical head for use therein, for scanning an optical record carrier. In particular, but not exclusively, the invention relates to a device for the simultaneous scanning of two different information layers of a multi-layer record carrier.

EP-A-0837455 describes an optical scanning device for scanning simultaneously at least two information layers and with partial beams which differ in terms of polarization direction and propagation behavior. The device includes a radiation source for supplying an input radiation beam, a polarizing prism-type beam splitter, and a birefringent collimator lens for producing two different beams which are projected through an objective lens to scan the different information layers. The birefringent lens provides a wavefront difference between the beams to read different information layers, but does not allow for variations in the spacing between the different information layers, or variations in the position of tracks within the different information layers.

JP-A-10149560 describes an optical scanning device for scanning simultaneously at least two information layers. The device includes a radiation source for supplying one radiation beam, one beam splitter, one collimator lens, a polarizability element having an optically uniaxial birefringence (for transforming the radiation beam into two radiation beams which differ in terms of polarization direction and propagation behavior), and one objective lens. Again, the wavefront difference between the beams is fixed.

JP-A-2000195097 describes optical scanning (reading or writing) devices for scanning a plurality of information layers. In one embodiment, the device includes one objective lens and a plurality of radiation sources and associated beam splitters for coupling a first partial beam with a plurality of partial beams which are used to scan different information layers. Each of the plurality of partial beams passes through a separately movable element to modify the scanning characteristics of the beams for the different layers. In another embodiment, the device includes a plurality of objective lenses and a single radiation source producing a beam which is split towards the different objective lenses by polarizing optics. Each of the different objective lenses is separately movable to modify the scanning characteristics of the beams for the different layers.

In accordance with the present invention there is provided an optical head for use in scanning a record carrier, the record carrier having data stored on data tracks therein on a plurality of information layers at a plurality of depths within the record carrier, wherein the optical head comprises:

a movable optical element arranged in an optical path to act upon a first radiation beam and a second radiation beam to provide the beams with a different displacement perpendicular to the optical path; and a lens system for focusing said first beam at a first focal point on a first information layer of the record carrier and the focusing of the second beam at a second different focal point on a second information layer, wherein a spacing, transverse to the data tracks, between said first and second focal points is controllable by varying the configuration of the movable optical element.

Such an arrangement allows for the simultaneous read out of two information layers of a multi-layer record carrier, and allows for variations in a transverse spacing between the data tracks of the information layers, for example due to an eccentricity of one or both layers of the record carrier being read to be accommodated using a common optical path for both scanning beams.

Further features and advantages of the invention will become apparent from the following description of preferred embodiments of the invention, given by way of example only, made with reference to the accompanying drawings wherein.

Figure 1:
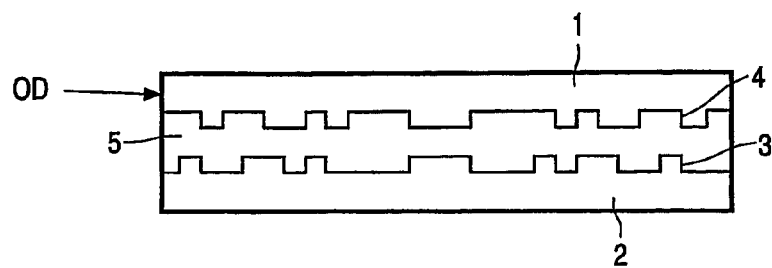
FIG. 1 shows a cross-section schematic view of a dual-layer optical disk OD in accordance with an embodiment of the present invention.

FIG. 1 shows a cross-section schematic view of a dual-layer optical disk OD in accordance with an embodiment of the present invention. The optical disk OD comprises a substrate 1 and a transparent layer 2, between which at least one information layer 3 is arranged. In the case of a dual-layer optical disk, as illustrated, two information layers 3, 4 are arranged behind the transparent layer 2, at different depths within the disk. A further transparent layer 5 separates the two information layers. The transparent layer 2 has the function of protecting the uppermost information layer 3, while mechanical support is provided by the substrate 1.

Information may be stored in the information layers 3, 4 of the optical disk in the form of optically detectable marks arranged in substantially parallel, concentric or spiral tracks, not indicated in FIG. 9. The marks may be in any optically readable form, e.g. in the form of pits, or areas with a reflection coefficient or a direction of magnetization different from their surroundings, or a combination of these forms.

Figure 2:
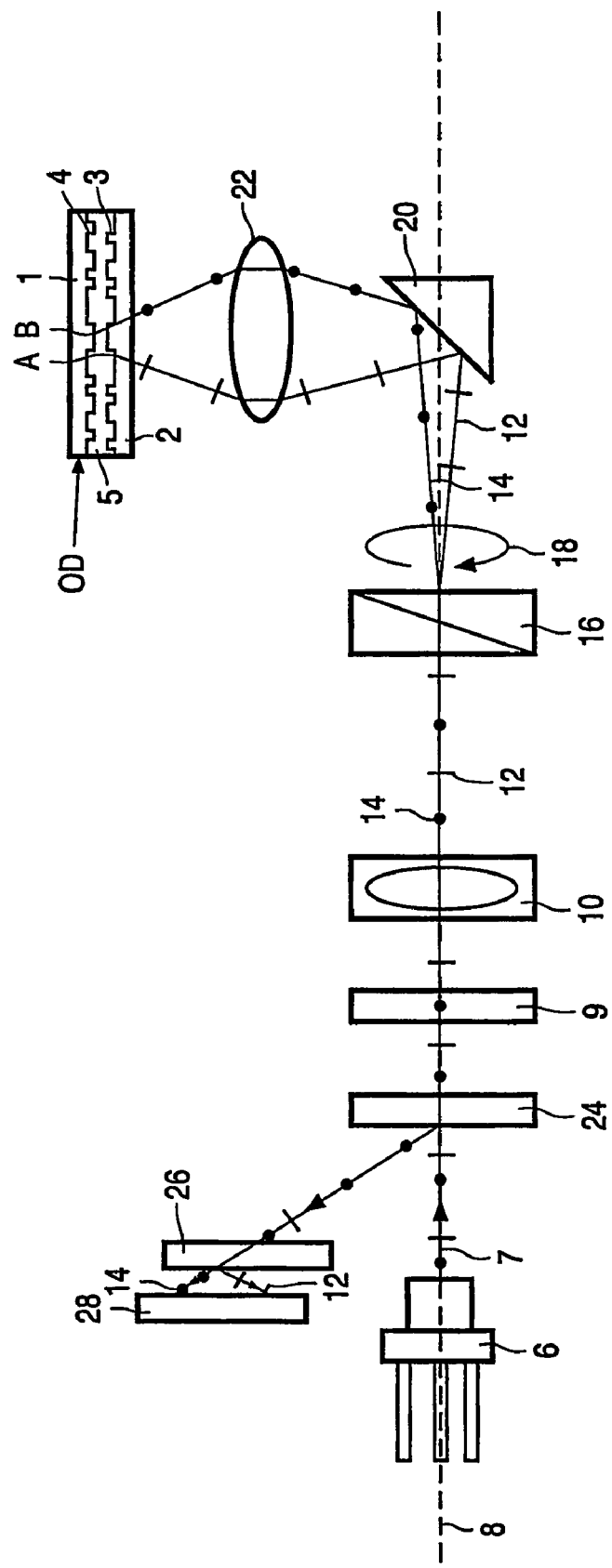
FIG. 2 shows a schematic illustration of components of an optical scanning device for scanning a dual-layer optical disk OD, in accordance with an embodiment of the present invention.

FIG. 2 shows a schematic illustration of components of an optical head for scanning a dual-layer optical disk OD, according to an embodiment of the present invention. The dual-layer optical disk OD in FIG. 2 is as described for FIG. 1 and the same reference labels are included therein.

The scanning device includes an optical pickup unit (OPU) mounted on a radially-movable arm. The OPU includes all components illustrated in FIG. 2, other than the disk OD. A radiation source 6, for example a single semiconductor laser, emits a radiation beam 7 of a predetermined frequency, for example 650 mm, with an optical axis 8. The radiation beam is collimated by a fixed collimator lens 9 to a collimated beam.

The radiation beam 7, in its collimated state, passes through a birefringent lens element. In this embodiment, the birefringent lens element is a passive liquid crystal lens 10. The radiation beam 7 is modified by the liquid crystal lens 10 to a first and second polarized beam 12, 14 respectively. The first and second polarized beams 12, 14 are orthogonally polarized with respect to each other and each have a different vergence. Both polarized beams 12, 14 follow the optical axis 8.

A movable optical element 16, positioned on the optical axis 8, has variable rotational configuration states by rotation 18 about the optical axis. In this embodiment, the movable optical element is a Wollaston prism 16, which includes a birefringent prism. The Wollaston prism separates the polarized beams 12, 14 following the optical axis 8 such that the polarized beams 12, 14 are both differently displaced perpendicular to the optical axis 8. The polarized beams 12, 14 are reflected by a folding mirror 20 to an objective lens 22 which focuses the first polarized beam 12 to a first spot A on the first information layer 3 of the optical disk OD. The objective lens 22 additionally focuses the second polarized beam 14 to a different spot B on the second information layer 4 of the disk OD. Both polarized beams 12, 14 are reflected by the first and second information layers 3, 4 respectively, of the disk OD and follow a common optical reverse beam path, the direction of which is altered by a beam director 24. The first and second polarized light beams 12, 14, following the common reverse beam path are split by a polarization dependent beam splitter 26 such that each polarized beam, 12, 14 is differently directed at a desired part of a detector system 28.

The detector system 28 includes a data detecting circuit for detecting a data signal corresponding to information read out from the first and second information layers 3, 4, and tracking and focus error detection circuits for detecting focus and tracking errors due to axial displacement of the beam spots, relative to the first and second information layers 3, 4, including a signal indicating mutual displacement of the beam spots in the radial direction, i.e. in the direction transverse to the data tracks in the two information layers 3, 4.

A data signal from the detector system 28 corresponding to detected mutual transverse displacement of the beams is used to vary the rotational configurations of the Wollaston prism 16 in a closed-loop servo system.

Figure 3:
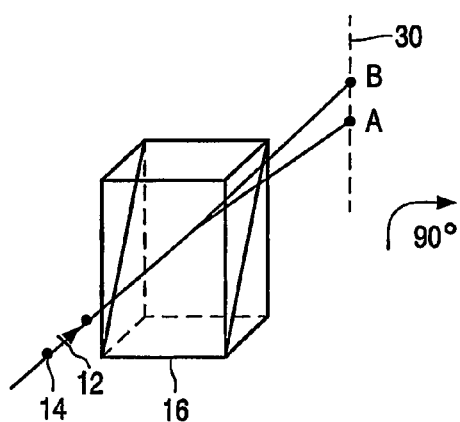
FIGS. 3, 4 and 5 illustrate a movable optical element in different rotational configurations, as according to an embodiment of the present invention.
Figure 4:
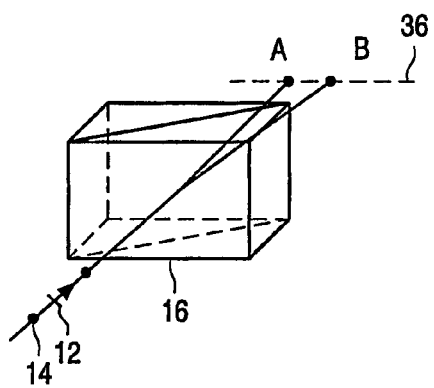
Figure 5:
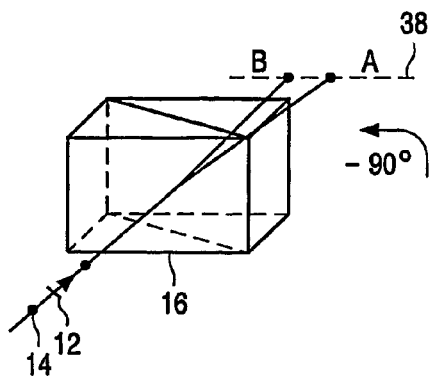

FIGS. 3, 4 and 5 show the Wollaston prism 16 as described and illustrated in FIG. 2 in different rotational configurations in accordance with an embodiment of the present invention. As shown in FIG. 3, the Wollaston prism 16 lies in a first rotational configuration and the orthogonally polarized first and second light beams 12, 14 following a common optical axis, are radially displaced by the Wollaston prism. As a result of this first rotational configuration of the Wollaston prism 16, the displacement between the first spot A of the first beam 12 on the first information layer 3 and the second spot B of the second beam 14 on the second information layer 4 describe the radial displacement line 30.

Figure 6:
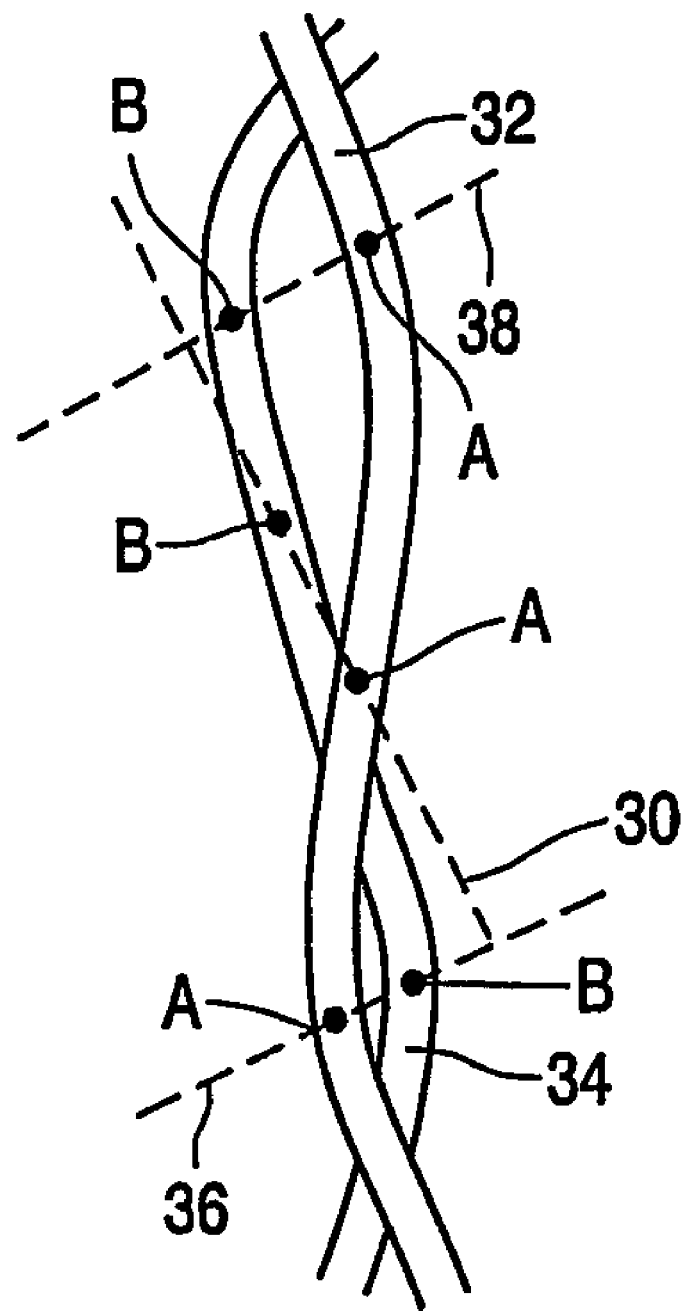
FIG. 6 shows schematically the radial tracking of radiation beams in accordance with an embodiment of the present invention.

Referring now also to FIG. 6, the tracking paths of beams 12, 14 whilst reading both information layers 3, 4 are shown showing variations of radial spacing between the tracking paths. The uppermost tracking path 32 of the first spot A on the first information layer 3 lies above a different tracking path 34 of the second spot B on the second information layer 4. The radial displacement line 30 is shown and corresponds to the first rotational configuration of the Wollaston prism shown in FIG. 3.

FIG. 4 shows a second rotational configuration of the Wollaston prism 16. In this configuration the prism is rotated by an angle of +90° about the rotational axis from the first rotational configuration. Consequently, displacement between the first spot A and second spot B now describes a second radial displacement line 36. In FIG. 6 this second radial displacement line 36 is illustrated and lies at the angle of 90° to the first radial displacement line 30.

Referring now to FIG. 5, a third rotational configuration of the Wollaston prism 16 is shown. In this configuration the Wollaston prism is rotated by an angle of −90° from the first rotational configuration about the rotational axis. As a result, displacement between the first spot A and the second spot B now describes a third radial displacement line 38. In FIG. 6, this third radial displacement line 38 is illustrated lying at the angle of −90° to the first radial displacement line 30.

In this described manner, and by varying rotational configurations of the Wollaston prism 16 by differently varying the angle of rotation about the rotational axis, the angle of a radial displacement line can be controlled. Consequently spots A and B can accommodate any variation in radial spacing between the first and second information layers 3, 4 as a result of an eccentricity of the two information layers of the disk OD.

Rotation of the Wollaston prism 16 about the rotational axis as described is achieved by an appropriate mechanical rotation mechanism (not shown).

In this embodiment of the present invention, the liquid crystal lens 10 is of a passive nature and as a result any axial displacement of the first and second beams 14, 12 and focusing at the spots A, B, is achieved by variation in the distance of the objective lens 22 from the information layers 3, 4 of the disk OD using a loop-servo setup between the detector system 28 and mechanical actuators (not shown) controlling the position of the objective lens 22. Variation of the position of the objective lens 22 is achieved using a data signal relating to axial tracking and focus errors from the detector system.

In a further envisaged embodiment of the present invention, the liquid crystal lens 10 includes both a passive and an active element. The active element can be varied by applying a voltage across electrodes in the liquid crystal lens which varies the vergence of the emerging light beams. In this example therefore, variation of the axial displacement of the first and second beam 3, 4 and the focusing at the spots A, B is achieved by a combination of variation of the active liquid crystal lens properties and the distance of the objective lens 22 from the information layers of the disk OD.

The above embodiments are to be understood as illustrative examples of the invention. Further embodiments of the invention are envisaged.

In a further embodiment it is envisaged that the Wollaston prism 16 is placed in the light path between the source 6 and the liquid crystal lens 10.

In another envisaged embodiment, the movable optical element is not limited to comprising a Wollaston prism. Different configuration states of the movable optical element may not necessarily be achieved by mechanical rotation of the element about a rotational axis, but for example by the movement of an appropriately configured birefringent element transverse to the optical axis.

The invention is, in one embodiment, applied to the scanning of dual-layer Digital Versatile Disks (DVDs). However, the optical head of the invention has utility to the scanning of different information layers of other types of multi-layer record carrier.

It is to be understood that further equivalents and modifications not described above may also be employed without departing from the scope of the invention, which is defined in the accompanying claims.

The invention claimed is:

1. An optical head for use in scanning a record carrier, the record carrier having data stored on data tracks therein on a plurality of information layers (3, 4) at a plurality of depths within the record carrier, wherein the optical head comprises:

a movable optical element (16) arranged in an optical path to act upon a first radiation beam (12) and a second radiation beam (14) to provide the beams with a different displacement perpendicular to the optical path; and a lens system for focusing said first beam (12) at a first focal point (A) on a first information layer (3) of the record carrier and the focusing of the second beam (14) at a second different focal point (B) on a second information layer (4), wherein a spacing, transverse to the data tracks, between said first and second focal points (A, B) is controlled by varying the configuration of the movable optical element (16) during scanning by said optical head of different information layers (3, 4) of the record carrier simultaneously using the first and second beams (12, 14).

2. An optical head according to claim 1, wherein the head is adapted to scan different information layers (3, 4) of the record carrier simultaneously using the first and second beams (12, 14).

3. An optical head according to claim 1 or 2, wherein the movable Optical element (16) is adapted to be rotated (18) about the optical path to obtain various configuration states.

4. An optical head according to claim 1, wherein said movable optical element (16) comprises a polarization dependent optical element.

5. Apparatus according to claim 4, wherein the movable optical element (16) comprises a Wollaston prism.

6. An optical head according to claim 4 or 5, wherein the first bean (12) is substantially orthogonally polarized with respect to the second beam (14).

7. An optical head according to claim 2, wherein said movable optical element (16) comprises a polarization dependent optical element.

8. Apparatus according to claim 7, wherein the movable optical element (16) comprises a Wollaston prism.

9. An optical head according to claim 7 or 8, wherein the first beam (12) is substantially orthogonally polarized with respect to the second beam (14).

10. An optical head according to claim 3, wherein said movable optical element (16) comprises a polarization dependent optical element.

11. Apparatus according to claim 10, wherein the movable optical element (16) comprises a Wollaston prism.

12. An optical head according to claim 10, wherein the first beam (12) is substantially orthogonally polarized with respect to the second beam (14).

13. An optical head according to claim 11, wherein the first beam (12) is substantially orthogonally polarized with respect to the second beam (14).

* * * * *